(12) United States Patent
Shinohara et al.

(10) Patent No.: US 11,004,321 B2
(45) Date of Patent: May 11, 2021

(54) WIRELESS IC TAG AND CONTAINER WITH WIRELESS IC TAG

(71) Applicant: TOPPAN PRINTING CO., LTD., Tokyo (JP)

(72) Inventors: Kenji Shinohara, Tokyo (JP); Takamitsu Nakabayashi, Tokyo (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 0 days.

(21) Appl. No.: 16/808,116

(22) Filed: Mar. 3, 2020

(65) Prior Publication Data

US 2020/0202690 A1 Jun. 25, 2020

Related U.S. Application Data

(63) Continuation of application No. PCT/JP2018/040266, filed on Oct. 30, 2018.

(30) Foreign Application Priority Data

Oct. 31, 2017 (JP) .............................. JP2017-210591

(51) Int. Cl.
*G08B 23/00* (2006.01)
*G08B 13/24* (2006.01)
(Continued)

(52) U.S. Cl.
CPC ..... *G08B 13/2431* (2013.01); *G06K 19/0716* (2013.01); *G06K 19/0723* (2013.01);
(Continued)

(58) Field of Classification Search
None
See application file for complete search history.

(56) References Cited

U.S. PATENT DOCUMENTS

| 6,226,619 B1 * | 5/2001 | Halperin | B65D 23/14 705/23 |
| 2015/0186770 A1 * | 7/2015 | Arai | B65D 41/3423 235/492 |

(Continued)

FOREIGN PATENT DOCUMENTS

FR 3021462 A1 11/2015
JP 2014-114066 A 6/2014

OTHER PUBLICATIONS

Interntional Searching Authority, "International Search Report," issued in connection with International Patent Application No. PCT/JP2018/040266, dated Dec. 18, 2018.

(Continued)

*Primary Examiner* — Julie B Lieu
(74) *Attorney, Agent, or Firm* — Foley & Lardner LLP

(57) ABSTRACT

A container with a wireless IC tag includes a container having a container body and a sealing member for sealing an opening portion of the container body; and a wireless IC tag and a cap seal attached to the container. The container body includes a neck (extending from the opening portion. The wireless IC tag includes an antenna for contactless communication, a wiring for wire break detection, and an IC chip connected to the antenna and the wiring. The cap seal includes a cylindrical member that surrounds the neck, the cylindrical member having a metal section disposed on a side face of the neck. The wireless IC tag is disposed to extend between opposite lateral sides of the neck via the sealing member and is partially sandwiched between the neck and the cylindrical member with the IC chip exposed from the cap seal.

6 Claims, 13 Drawing Sheets

(51) Int. Cl.
    *G06K 19/07*    (2006.01)
    *G06K 19/077*   (2006.01)
    *B65D 1/02*     (2006.01)
    *B65D 39/00*    (2006.01)

(52) U.S. Cl.
    CPC ........ *G06K 19/07758* (2013.01); *B65D 1/023* (2013.01); *B65D 39/0005* (2013.01); *B65D 2555/02* (2013.01)

(56) References Cited

U.S. PATENT DOCUMENTS

| | | | |
|---|---|---|---|
| 2016/0001936 A1* | 1/2016 | Rap | B65D 43/16 |
| | | | 222/490 |
| 2016/0042214 A1* | 2/2016 | Barack | H04B 5/0056 |
| | | | 340/10.4 |
| 2016/0048712 A1* | 2/2016 | Butler | H01Q 1/38 |
| | | | 340/10.51 |
| 2017/0183135 A1* | 6/2017 | Pic | B65D 39/0058 |
| 2019/0205715 A1* | 7/2019 | Kato | G06K 19/07798 |
| 2019/0236429 A1* | 8/2019 | Shinohara | B65D 41/62 |

OTHER PUBLICATIONS

International Searching Authority, "Written Opinion," issued in connection with International Patent Application No. PCT/JP2018/040266, dated Dec. 18, 2018.
Extended European Search Report dated Nov. 5, 2020 for corresponding European Patent Application No. 18873543.5.

* cited by examiner

WIRELESS IC TAG AND CONTAINER WITH WIRELESS IC TAG

CROSS-REFERENCE TO RELATED PATENT APPLICATIONS

This application is a continuation application filed under 35 U.S.C. § 111(a) claiming the benefit under 35 U.S.C. §§ 120 and 365(c) of International Patent Application No. PCT/JP2018/040266, filed on Oct. 30, 2018, which is based upon and claims the benefit of priority to Japanese Patent Application No. 2017-210591, filed on Oct. 31, 2017, the disclosures of which are all incorporated herein by reference in their entireties.

TECHNICAL FIELD

The present invention relates to a container with a wireless IC tag having a cap seal and a wireless IC tag, and relates to a wireless IC tag for use with the container.

BACKGROUND ART

Products are typically produced in factories and sold in stores to consumers, for example. Vendors of stores guarantee the consumers the quality of products produced in authorized factories and sold through authorized distribution channels. That is, products sold in authorized channels are distinguished from counterfeit products to ensure the quality of products at a certain level or more, and thus products with improved reliability are provided to consumers.

In particular, when a product is an item which strongly requires measures to prevent counterfeiting, for example, a famous brand product or an expensive product such as high-grade liquor, the following measures are taken. That is, an area surrounding an opening portion of a container such as a bottle is covered with a cap seal to prevent outside air from entering the container and indicate that the container has not been tampered with. Further, the cap seal includes a wireless IC tag having a high security function and storing a unique tag ID number to thereby try to prevent the product from being forged.

According to the cap with a wireless IC tag disclosed in PTL 1, an antenna of the wireless IC tag in the cap is not broken when the cap of the bottle is opened, so the wireless IC tag can still communicate with an external device after the cap is opened. Accordingly, an external device can read a tampered flag of the cap or product information from the wireless IC tag even after the cap is opened.

[Citation List] [Patent Literature] PTL 1: JP 2014-114066 A

SUMMARY OF THE INVENTION

Technical Problem

A cap seal provided with a wireless IC tag includes, for example, a cylindrical member for covering a side face of the container near the opening portion, and a top face connected to an end of the cylindrical member and configured to cover the top of the container near the opening section. In attachment of the cap seal having the cylindrical member made of a shrink film to the container, a portion of the container near the opening portion is first inserted into the cylindrical member, which has a cylindrical shape with an inner diameter larger than an outer diameter of the portion of the container, and the cylindrical member is then heated to shrink it so that the cap seal is fitted onto the container.

In the process of fitting the cap seal onto the container by heating, the contents of the container may also be heated to some extent. Therefore, if the contents, such as wine, are easily altered in quality when exposed to heat, it is preferred to use a metal cylindrical member and top face, and apply a pressure to the cap seal to fit it onto the container.

The cylindrical member made of a metal can be regarded as forming a closed annular conductive path, and thus forming one turn of a coil. As a consequence, when the wireless IC tag is positioned on the top face, the top face made of metal and the wireless IC tag are overlapped with each other, and the wireless IC tag is positioned on the center axis of the coil. As a result, an induced current passing through the coil causes varying electromagnetic fields, which may deteriorate communication characteristics of the wireless IC tag.

The present invention has been made to provide a container with a wireless IC tag, and a wireless IC tag, capable of reducing deterioration in communication characteristics of the wireless IC tag due to a metal cap seal.

Improvement or Solution to Problem

A container with a wireless IC tag for solving the above problem includes: a container having a container body and a sealing member for sealing an opening portion of the container body; and a wireless IC tag and a cap seal attached to the container, wherein the container body includes a neck that extends from the opening portion, the wireless IC tag includes an antenna for contactless communication, a wiring for wire break detection, and an IC chip connected to the antenna and the wiring, the cap seal includes a cylindrical member that surrounds the neck, the cylindrical member having a metal section disposed on a side face of the neck, and the wireless IC tag is disposed to extend between opposite lateral sides of the neck via the sealing member, and is partially sandwiched between the neck and the cylindrical member with the IC chip being exposed from the cap seal.

A wireless IC tag for solving the above problem is a wireless IC tag configured to be attached, together with a cap seal for covering a neck, to a container that includes a container body having an opening portion and the neck extending from the opening portion, and a sealing member that seals the opening portion, the wireless IC tag includes: an antenna for contactless communication; a wiring for wire break detection; and an IC chip connected to the antenna and the wiring, wherein the wireless IC tag, when attached to the container while being sandwiched between the cap seal and the container, extends between opposite lateral sides of the neck via the sealing member with the IC chip being exposed from the cap seal.

A wireless IC tag for solving the above problem is a wireless IC tag configured to be attached, together with a cap seal for covering a neck, to a container that includes a container body having an opening portion and the neck extending from the opening portion, and a sealing member that seals the opening portion, the wireless IC tag comprising: an antenna for contactless communication; a wiring for wire break detection; and an IC chip connected to the antenna and the wiring, wherein the wireless IC tag includes a portion configured to be positioned on the sealing member, and two extending portions that extend from the portion in directions away from each other, and a first one of the extending portions is formed longer than the cap seal while the IC chip is positioned in an end region of the first one extending portion.

According to the above configurations, because the IC chip of the wireless IC tag is exposed from the cap seal, influence of the cap seal on the electromagnetic field is reduced in the wireless IC tag. As a result, communication characteristics of the wireless IC tag can be reduced in or prevented from deteriorating. Further, since the IC chip is exposed from the cap seal, a pressure applied when the cap seal is attached to the container is minimized. Accordingly, a decrease in function of the IC chip can be minimized.

In the above container with a wireless IC tag, the wireless IC tag may include a substrate having a first surface and a second surface, which is a surface facing away from the first surface, the antenna may include a coil section located on the first surface, the coil section having discontinuous portions on the first surface, a jumper wire located on the second surface, the jumper wire overlapping the coil section with the substrate therebetween so as to connect the discontinuous portions of the coil section, and a connection conductor that penetrates the substrate and electrically connects an end of the jumper wire to the coil section, and the jumper wire may be exposed from the cap seal.

According to the above configuration, since the jumper wire is exposed from the cap seal, deformation of the jumper wire due to a pressure applied when the cap seal is attached to the container is minimized. Accordingly, conduction by the communication antenna can be prevented from being interrupted.

In the above container with a wireless IC tag, the antenna may be partially covered with the cap seal.

According to the above configuration, a region of the wireless IC tag which is exposed from the cap seal is prevented from being too large. Accordingly, a large area can be reserved for a region protected by the cap seal. Further, an area required for providing the cap seal and the wireless IC tag is prevented from being too large.

In the above container with a wireless IC tag, the cap seal may include a top face that is connected to a first end, which is one of two axial ends of the cylindrical member, and closes the cylindrical member at the first end, and the IC chip may be exposed from a second end, which is the other of the two axial ends of the cylindrical member.

According to the above configuration, since the wireless IC tag is not located on the center axis of the coil formed by the cap seal, communication characteristics of the wireless IC tag can be reduced in or even prevented from deteriorating. Further, since the IC chip can be exposed from the cap seal without forming an opening in the cap seal, formation of the cap seal and alignment of the cap seal with the IC chip can be facilitated.

In the container with a wireless IC tag, the cap seal may include a top face that is connected to a first end, which is one of two axial ends of the cylindrical member, and closes the cylindrical member at the first end, and the wireless IC tag may include a dense wiring portion in which wirings for the wire break detection are densely arranged, and the dense wiring portion may be located between the top face and the sealing member.

According to the above configuration, if the contents of the container are replaced through the top face and the sealing member, the wiring for wire break detection is disconnected. Accordingly, replacement of the contents can be detected by the above wire break detection.

In the above container with a wireless IC tag, the wireless IC tag may include a substrate having a first surface and a second surface, which is a surface facing away from the first surface, wherein the antenna and a portion in which wirings for the wire break detection are densely arranged may be overlapped with each other with the substrate therebetween.

According to the above configuration, the wireless IC tag can be reduced in size.

In the above container with a wireless IC tag, the wireless IC tag may include a substrate having a first surface and a second surface, which is a surface facing away from the first surface, wherein the antenna and a portion in which wirings for the wire break detection are densely arranged may not be overlapped with each other with the substrate therebetween.

According to the above configuration, the degree of freedom in arrangement position of the antenna, and thus the degree of freedom in arrangement position of the IC chip increases.

In the container with a wireless IC tag, the cap seal may include a top face that is connected to a first end, which is one of two axial ends of the cylindrical member, and closes the cylindrical member at the first end, and the cylindrical member may include at least one insulating section extending from the first end, and the metal section and the insulating section may be joined to each other to form a closed annular shape in a circumferential direction of the cylindrical member.

According to the above configuration, the inductance of the cylindrical member can be reduced compared with a configuration in which a closed annular conductive path is formed in the cylindrical member. Accordingly, communication characteristics of the wireless IC tag can be reduced in or even prevented from deteriorating.

Advantageous Effects of Invention

According to the present invention, deterioration in communication characteristics of the wireless IC tag due to the metal cap seal can be lessened or even minimized.

DETAILED DESCRIPTION

Figure 1:
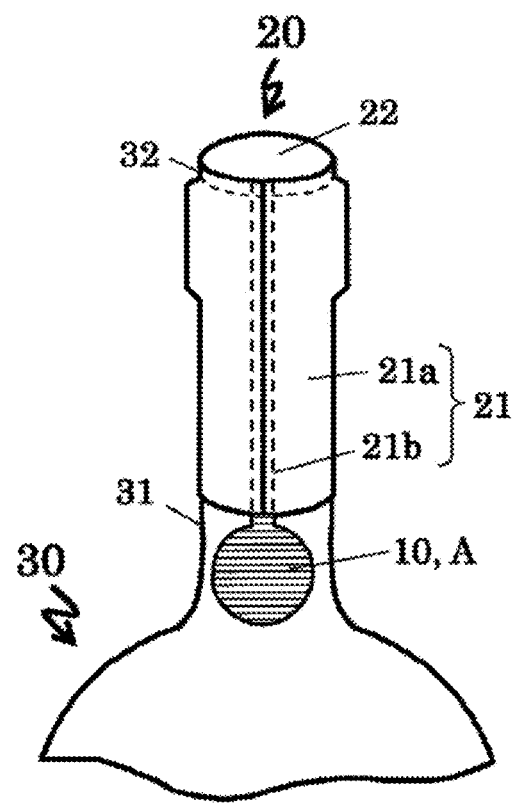
FIG. 1 is a perspective view illustrating a structure of a container with a wireless IC tag according to a first embodiment.

With reference to the accompanying Figures, a description will now be given of representative embodiments according to the present invention. The present invention is not limited to the following representative embodiments, and appropriate modifications can be made without departing from the spirit of the present invention. The representative embodiments described below are merely examples of the present invention, and the design thereof could be appropriately changed by one skilled in the art. Here, the drawings are schematic, and the relationship between thickness and plane size, the ratio of the thickness of each layer, etc., may be different from actual ones. The embodiments described below are merely examples of the configurations for embodying the technical idea of the present invention, and the technical idea of the present invention should not limit the materials, shapes, structures, and the like of the components to those described below. The technical idea of the present invention can be modified in various ways within the technical scope specified by the claims.

The same constituent elements are denoted by the same reference numerals unless there is a reason for the sake of convenience, and redundant description is omitted. In the drawings referred to in the following description, for clarity, characteristic parts are enlarged, and thus the components are not shown to scale. It is, however, clear that one or more embodiments can be implemented without such details. In addition, known structures and devices may be schematically represented for simplicity.

First Embodiment

With reference to FIGS. 1 to 10, a first embodiment of a container with a wireless IC tag, and a wireless IC tag will be described.

(Container with Wireless IC Tag)

As shown in FIG. 1, a container with a wireless IC tag of a first embodiment includes a container composed of a container body 30 and a sealing member 32, and a wireless IC tag 10 and a cap seal 20 attached to the container. The cap seal may also be referred to as a capsule, a sheath, or a protective sleeve.

The container body 30 is a bottle or a plastic container for storing sake, wine, jam, dressing, sauce, spices, and the like. The container body 30 has an opening through which contents are introduced or extracted. The opening is closed by the sealing member 32 such as a cap or a cork. A portion of the container body 30 having the above opening is an opening portion, and the opening portion is closed by the sealing member 32.

The shape of the container body 30, the size of the container body 30, and the contents stored in the container body 30 are not particularly limited. The shape or material of the sealing member 32 is not particularly limited as long as it has a structure of closing the opening of the container body 30. The sealing member 32 may be a plug inserted into the opening, or a cap covering the opening.

Figure 2:
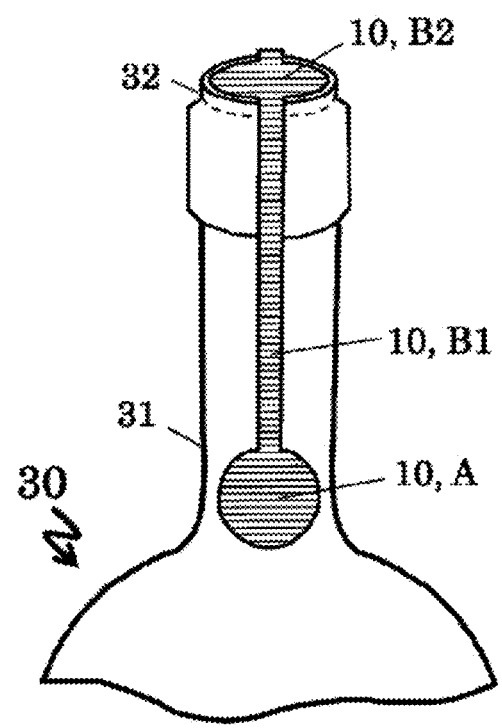
FIG. 2 is a perspective view illustrating that a wireless IC tag is disposed on a container of the first embodiment.
Figure 3:
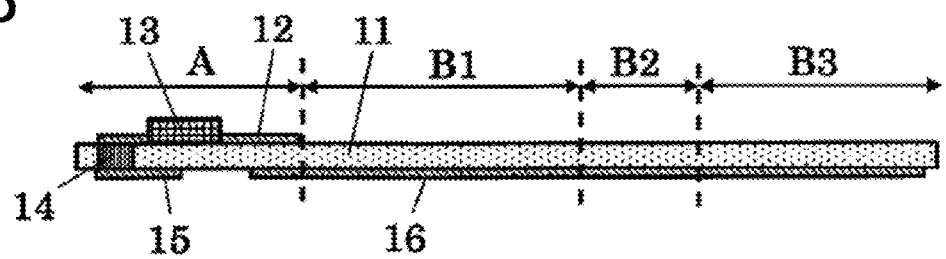
FIG. 3 is a schematic cross-sectional view illustrating a cross-sectional structure of a wireless IC tag of the first embodiment.
Figure 4:
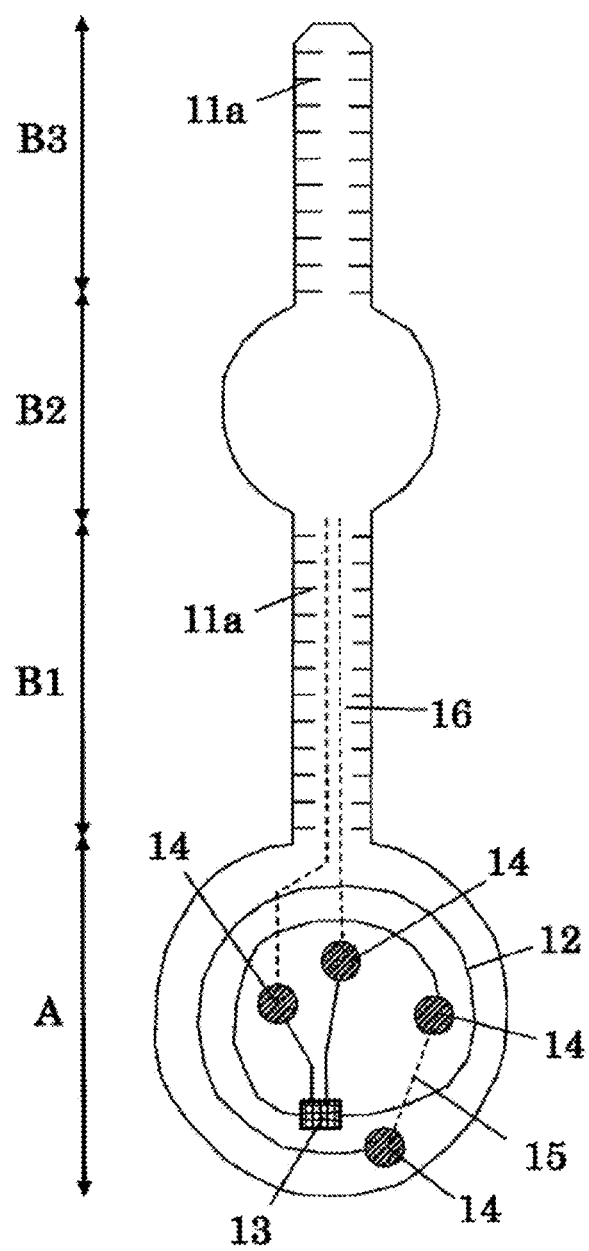
FIG. 4 is a plan view of a wiring pattern on a front surface of a wireless IC tag of the first embodiment.

FIG. 2 shows that, of the wireless IC tag 10 and the cap seal 20, only the wireless IC tag 10 is attached to the container. Further, FIG. 3 shows a cross-sectional structure of the wireless IC tag 10 in the extending direction thereof, and FIG. 4 shows a planar structure of the wireless IC tag 10. The wireless IC tag 10 includes an inlet A and a wire break detection unit B. The wire break detection unit B is composed of a wire break detection unit B1, a wire break detection unit B2, and a wire break detection unit B3.

As shown in FIG. 2, the inlet A of the wireless IC tag 10 is disposed in the lower part of a neck 31, which is a portion of the container body 30 extending from the opening portion. The wire break detection unit B of the wireless IC tag 10 extends from a position on the neck 31 at which the inlet A is located to a position on the neck 31 on the opposite side of the above position via the sealing member 32. The wire break detection unit B2 of the wireless IC tag 10 is bonded to the sealing member 32.

Specifically, the wire break detection unit B2 of the wire break detection unit B shown in FIG. 4 is disposed on the sealing member 32, and the wire break detection unit B1 and the wire break detection unit B3 are disposed on the outer peripheral surface of the neck 31. Accordingly, a first linear wiring 16a of the wire break detection unit B1 and a second linear wiring 16b of the wire break detection unit B3 are located extending along the outer peripheral surface of the neck 31.

As shown in FIG. 1, the cap seal 20 includes the neck 31 and the sealing member 32 of the container body 30, and the wireless IC tag 10 attached to the neck 31 and the sealing member 32. The cap seal 20 covering the container indicates that the container has not been tampered with. The wire break detection unit B of the wireless IC tag 10 is sandwiched between the cap seal 20 and the container, and the wire break detection unit B1 and the wire break detection unit B3 of the wireless IC tag 10 are bonded to the inner surface of the cap seal 20 that covers the neck 31.

Alternatively, the wire break detection unit B1 and the wire break detection unit B3 of the wireless IC tag 10 can be adhered in advance to the inner surface of the cap seal 20, which in turn is attached to the container while the wire break detection unit B2 of the wireless IC tag 10 can be bonded to the sealing member 32 to thereby allow the cap seal 20 and the wireless IC tag 10 to be attached to the container.

The cap seal 20 is made of metal, and the inlet A of the wireless IC tag 10 is exposed from the cap seal 20 as shown in FIG. 1. Alternatively, the cap seal 20 may cover only an upper part of the inlet A, and a center part and a lower part of the inlet A may be exposed from the cap seal 20.

In opening of the container, usually, the cap seal 20 covering the neck 31 is first peeled, and then the sealing member 32 is removed from the neck 31. Therefore, when the container is opened, at least one of the first linear wiring 16a of the wire break detection unit B1 and the second linear wiring 16*b* of the wire break detection unit B3 in the wire break detection wiring 16 of the wire break detection unit B is disconnected. Such disconnection in the wire break detection wiring 16 is detected and stored by an IC chip 13 of the wireless IC tag 10.

(Wireless IC Tag 10)

Figure 5:
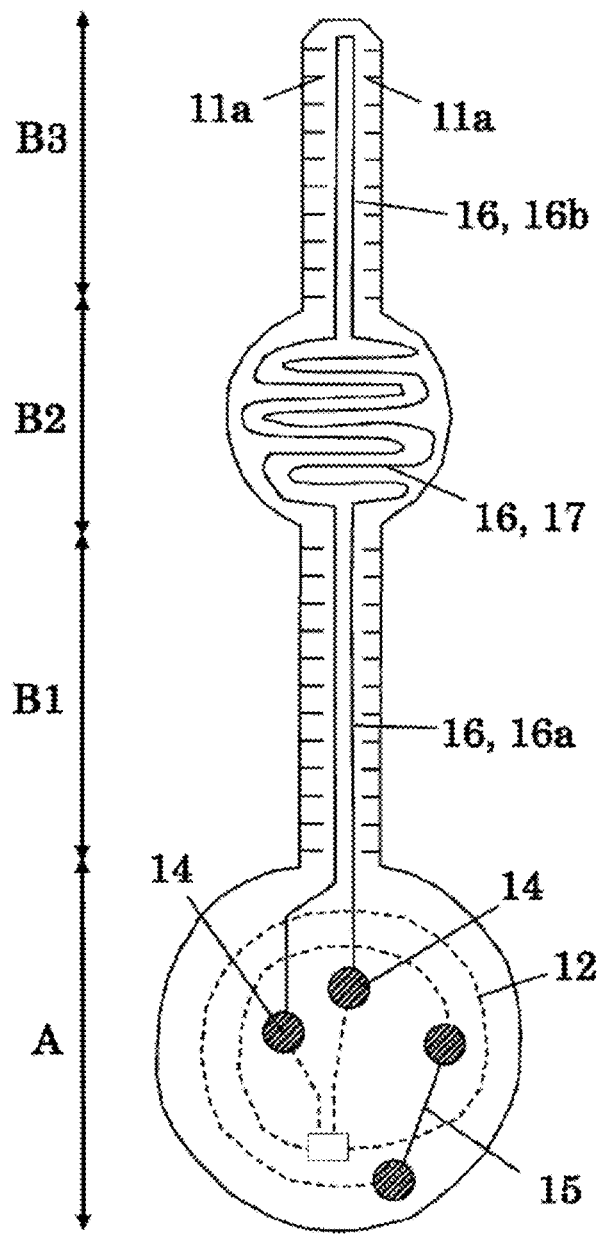
FIG. 5 is a plan view of a wiring pattern on a rear surface of a wireless IC tag of the first embodiment.
Figure 6:
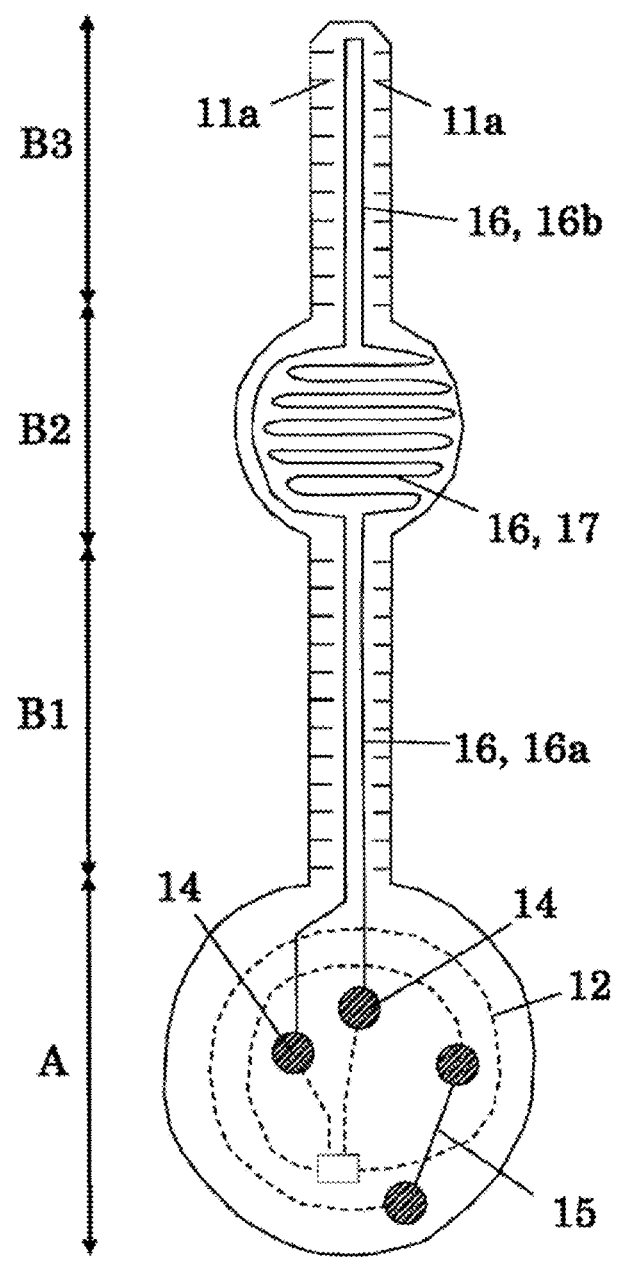
FIG. 6 is a plan view of another wiring pattern on a rear surface of a wireless IC tag of the first embodiment.
Figure 7:
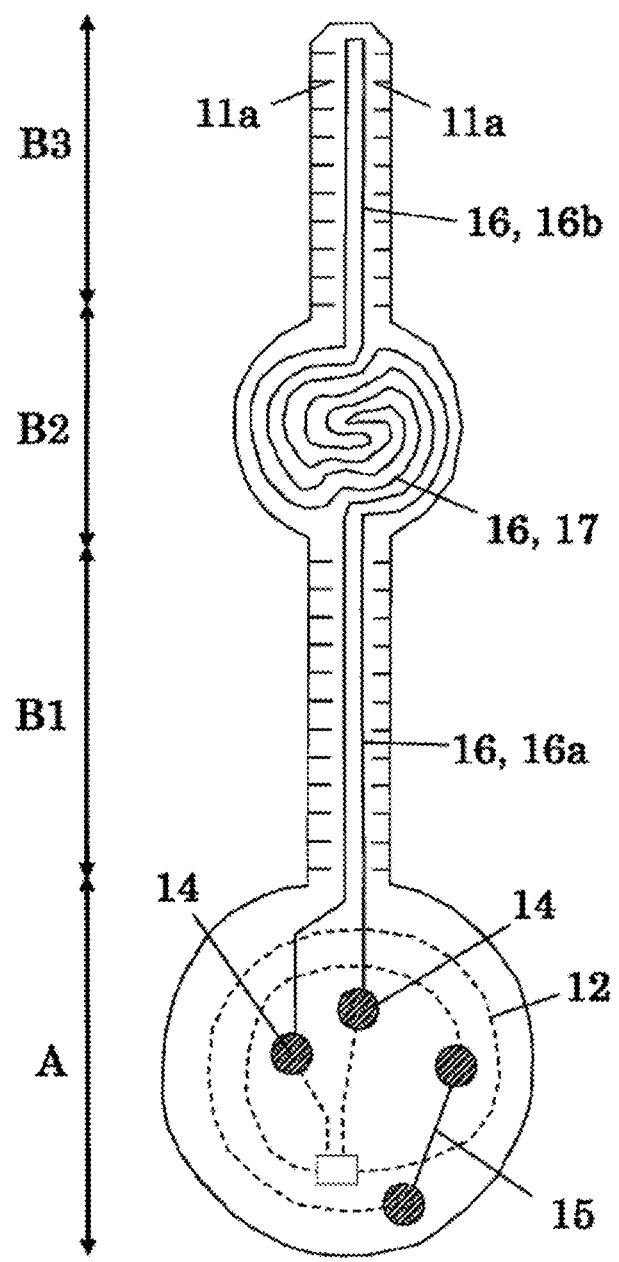
FIG. 7 is a plan view of another wiring pattern on a rear surface of a wireless IC tag of the first embodiment.

The wireless IC tag 10 is a tag having a contactless communication unit used for an RFID system, and a container tamper detection unit. FIGS. 3 to 7 illustrate configurations of the wireless IC tag 10. FIG. 4 illustrates a schematic wiring pattern on a front surface of the wireless IC tag 10, and FIGS. 5 to 7 illustrate various schematic wiring patterns on a rear surface of the wireless IC tag in a transparent view through the front surface.

As shown in FIG. 3, the wireless IC tag 10 includes the inlet A and the wire break detection unit B. The inlet A and the wire break detection unit B each include a substrate 11 and a wiring on the substrate 11. A front surface conductive wiring and a rear surface conductive wiring are formed on the front surface and the rear surface of the substrate 11, respectively. The front surface conductive wiring and the rear surface conductive wiring are connected to each other via a penetrating connection conductor 14. The front surface of the substrate 11 is an example of the first surface, and the rear surface of the substrate 11 is an example of the second surface.

[Substrate 11 and Conductive Wiring]

The substrate 11 may be made of, for example, various resin films such as PET (polyethylene terephthalate), paper, and synthetic paper. The conductive wiring formed on the front surface and the rear surface of the substrate 11 is preferably a thin film made of an electrically conductive material.

The thin film made of an electrically conductive material may be a film of aluminum, copper, gold, silver, or the like, or may be a coating film containing a metallic material. The method of forming the conductive wiring may be etching, printing, plating, or other methods. For example, the conductive wiring can be formed by screen-printing a silver-based conductive paste on the substrate 11 made of paper.

As described above, the wireless IC tag 10 extends from a position on the neck 31 to a position on the neck 31 on the opposite side of the above position via the sealing member 32 such that the container body 30 is interposed therebetween. The wire break detection unit B1 of the wireless IC tag 10 is disposed on the outer peripheral surface of the neck 31, the wire break detection unit B2 is bonded to the sealing member 32, and the wire break detection unit B3 is disposed on the outer peripheral surface of the neck 31 on the opposite side of the wire break detection unit B1 with the sealing member 32 interposed therebetween. The wire break detection unit B1 and the wire break detection unit B3 are bonded with an adhesive to the cap seal 20 that covers the wireless IC tag 10.

As shown in FIGS. 4 to 7, the wireless IC tag 10 has an elongated shape extending in one direction.

[Inlet A]

As shown in FIG. 4, the inlet A of the wireless IC tag 10 includes a communication antenna formed by connecting the antenna coil 12 composed of the front surface conductive wiring located on the front surface of the substrate 11, and a jumper wire 15 located on the rear surface via a penetrating connection conductor 14, and an IC chip 13 electrically connected to an end of the antenna coil 12.

[Communication Antenna]

As shown in FIG. 4, the antenna coil 12 of the communication antenna in the inlet A is electrically connected to an electrode terminal for contactless communication unit by the IC chip 13. The antenna coil 12 is formed of the front surface conductive wiring having a line width of, for example, approximately 10 µm, which is looped multiple times on the front surface of the substrate 11. The antenna coil 12 is connected to the jumper wire 15 located on the rear surface of the substrate 11 via the penetrating connection conductor 14 to thereby form a communication antenna. The pattern shape of the communication antenna is determined according to desired frequency characteristics or communication characteristics such as communication range.

[Penetrating Connection Conductor 14 and Jumper Wire 15]

A portion of the communication antenna in which the wirings intersect each other in a three-dimensional manner on the front and rear surfaces of the substrate 11 is formed of the antenna coil 12 located on the front surface of the substrate 11, the penetrating connection conductor 14, and the jumper wire 15 located on the rear surface of the substrate 11. That is, one end of the antenna coil 12 is connected to one end of the jumper wire 15 via the penetrating connection conductor 14 such that the jumper wire 15 intersects the antenna coil 12 in a three-dimensional manner. Then, the other end of the jumper wire 15 is connected to the other end of the antenna coil 12 via the penetrating connection conductor 14 to thereby complete the wiring of the communication antenna.

The wire break detection unit B1 and the wire break detection unit B3 of the wireless IC tag 10 have each a length corresponding to the length of the cap seal 20, whereas the inlet A of the wireless IC tag 10 adjacent to the wire break detection unit B1 may partially overlap the cap seal 20. For this reason, the IC chip 13 and the jumper wire 15 are disposed on a side farther from the wire break detection unit B1 than the center of the inlet A is.

As described above, since the IC chip 13 and the jumper wire 15 are disposed on the inlet A on a side that is not close to the wire break detection unit B1, the cap seal 20 does not reach the portions where the jumper wire 15 and the IC chip 13 are mounted even if the cap seal 20 overlaps the inlet A.

Accordingly, when the metal cap seal 20 is rolled to be fitted onto the container, the portions of the inlet A in the wireless IC tag 10 where the jumper wire 15 and the IC chip 13 are mounted are unlikely to undergo stress from the rolling. Therefore, functions of the jumper wire 15 and the IC chip 13 can be prevented from being reduced by the rolling. In addition, when the cap seal 20 is torn to open the container, which causes the wire break detection unit B of the wireless IC tag 10 to be torn together with the cap seal 20, and causes the wire break detection wiring 16 to be disconnected, the jumper wire 15 and the IC chip 13 can be prevented from being broken.

Frequency bands that can allow communication using small antennas, such as the 13.56 MHz band, 900 MHz band, 2.45 GHz band, or 5.8 GHz band, are used for a communication frequency of the communication antenna. The wireless IC tag 10 having such a communication antenna has a communicable distance in a range approximately from several centimeters to one meter. Further, since energy for driving the IC chip 13 is radiated as electromagnetic waves from a reader close to the communication antenna, a battery that functions as an energy source is not built into the inlet A. Therefore, the wireless IC tag 10 is used semipermanently as long as the inlet A is not destroyed.

[IC Chip 13]

The antenna coil 12 is electrically connected to an electrode terminal for contactless communication unit in the IC chip 13. Further, the wire break detection wiring 16 is electrically connected to an electrode terminal of a container tamper detection unit of the IC chip 13.

The IC chip 13 and the antenna coil 12 may be connected by solder, or a binder which contains metal particles such as an anisotropic conductive paste (ACP) or an anisotropic conductive film (ACF).

The IC chip 13 may have, for example, a square shape having a side approximately in the range of 0.05 mm to 0.5 mm in plan view, and may have a thickness, for example, of 0.1 mm. The IC chip 13 may be bare, or may be sealed by a sealing member as is used with various IC packages or in chip size packages (CSPs).

The contactless communication unit of the IC chip 13 communicates with a reader device of an RFID system by using a predetermined communication protocol, and transmits information on the contents in the container body 30 and information on whether the container has been tampered with to the reader device.

Further, the wire break detection wiring 16 on the rear surface of the substrate 11 is electrically connected to the electrode terminal for the container tamper detection unit in the container IC chip 13 via the penetrating connection conductor 14. The IC chip 13 has a function of monitoring a resistance of the wire break detection wiring 16 electrically connected to the above terminal. The IC chip 13 includes a container tamper detection unit for determining that the wire break detection wiring 16 is disconnected and the product has been tampered with when the resistance of the wire break detection wiring 16 changes from a first value, which is a predetermined value, to a second value different from the first value. The container tamper detection unit stores the disconnection of the wire break detection wiring 16, that is, whether the container has been tampered with or not.

[Wire Break Detection Unit B]

As shown in FIGS. 5, 6 and 7, the wire break detection wiring 16 is formed of the rear surface conductive wiring in the wire break detection unit B on the rear surface of the substrate 11. The wire break detection unit B is composed of a wire break detection unit B1 disposed on the neck 31 of the container body 30, the wire break detection unit B2 disposed on the sealing member 32, and the wire break detection unit B3 disposed on the neck 31 of the container body 30 on the opposite side of the wire break detection unit B1.

In the wire break detection unit B1 and the wire break detection unit B3, a plurality of slits 11a are formed in the substrate 11. The respective slits 11a extend inward from the edge of the substrate 11. The respective slits 11a are cuts formed in the substrate 11, and may or may not penetrate the substrate 11 in a thickness direction. In the wire break detection unit B1 and the wire break detection unit B3, the wire break detection wiring 16 is positioned in the center part of the substrate 11, which is located beyond the ends of the slits 11a.

When the cap seal 20 is torn to open the container, the slits 11a induce breakage of the wireless IC tag 10 so that the wire break detection unit B of the wireless IC tag 10 is torn together with the cap seal 20 to cause the wire break detection wiring 16 to be disconnected. For this reason, the wire break detection unit B1 and the wire break detection unit B3 are bonded to a surface of the cap seal 20 which faces the container body 30 via an adhesive.

[Wire Break Detection Wiring 16]

The wire break detection wiring 16 is connected to a pair of electrode terminals for container tamper detection unit of the IC chip 13 via the wiring on the front surface of the substrate 11 and the penetrating connection conductor 14. The wire break detection wiring 16 is formed of one wire which extends continuously from one end to the other end.

Specifically, as shown in FIG. 5, the wire break detection wiring 16 is a single wire including the first linear wiring 16a of the wire break detection unit B1, a dense wiring 17 of the wire break detection unit B2, and the second linear wiring 16b of the wire break detection unit B3.

[Wire Break Detection Unit B2]

The wire break detection unit B2 in the wire break detection unit B of the wireless IC tag 10 is disposed at a position that covers the sealing member 32. In the wire break detection unit B2, the wire break detection wiring 16 constitutes the dense wiring 17.

As shown in FIGS. 5, 6 and 7, the dense wiring 17 of the wire break detection unit B2 forms a pattern such as a folded line shape or a spiral shape that extends across the sealing member 32 multiple times. More specifically, as shown in FIG. 5 or 6 for example, the dense wiring 17 forms a folded line shape of a zig-zag pattern having a plurality of bent portions, in other words, a meandering pattern. Further, as shown in FIG. 7 for example, the dense wiring 17 may form a spiral pattern that extends across the sealing member 32 multiple times.

Figure 8:
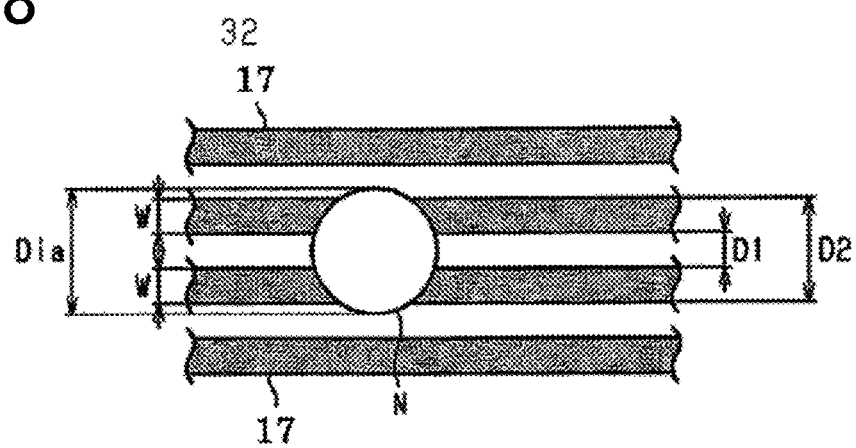
FIG. 8 is an enlarged plan view of a part of a dense wiring of a wire break detection unit in a wireless IC tag of the first embodiment.

As shown in FIG. 8, the dense wiring 17 of the wire break detection unit B2 is formed by arranging conductor wires, having a wiring width W, with a wire-to-wire distance D1 between the adjacent conductor wires. D1+2×W, which is a sum of the wire-to-wire distance D1 and the wiring widths W of two adjacent conductor wires, is defined as a second distance D2. The second distance D2 is preferably in the range of 0.225 mm or more and 3 mm or less.

The contents such as wine stored in the container body 30 such as a wine bottle may be replaced with a counterfeit in the following manner. A needle N of a cylindrical shape may be pierced into the sealing member 32 such as a cork that closes the opening of the container body 30, and the genuine contents are extracted from the container body 30 via the needle N and the counterfeit contents are introduced into the container body 30.

In the present embodiment, when the needle N is pierced into the sealing member 32, the dense wiring 17 of the wire break detection unit B2 disposed in the sealing member 32 is disconnected. The disconnection of the dense wiring 17 is detected and stored in the IC chip 13. Thus, the IC chip 13 can detect and store that the contents in the container body 30 has been replaced.

In the dense wiring 17, the second distance D2 is preferably not larger than a diameter Dia of the needle N. When the second distance D2 is in the range of 0.225 mm or more and 3 mm or less, a probability of the second distance D2 being not larger than the diameter Dia of the needle N increases. Accordingly, disconnection in the dense wiring 17 by the needle N is more likely to occur.

The wiring widths W in the dense wiring 17 are not necessarily constant across the entirety of the dense wiring 17, and the wire-to-wire distances D1 are not necessarily constant in all the adjacent conductor wires. Even if the wiring widths W or the wire-to-wire distances D1 are not constant, it is acceptable when the second distances D2 at different positions in the dense wiring 17 are each within the above range.

As described above, the wire break detection unit B2 is positioned on the sealing member 32, and the wire break detection unit B1 and the wire break detection unit B3 are positioned on the outer peripheral surface of the neck 31. That is, the wire break detection unit B is disposed to extend between opposite lateral sides of the neck 31 of the container body 30 via the sealing member 32. Accordingly, the first linear wiring 16a of the wire break detection unit B1 and the second linear wiring 16b of the wire break detection unit B3 are located extending along the outer peripheral surface of the neck 31.

When the container is opened, at least one of the first linear wiring 16a and the second linear wiring 16b is disconnected, and the disconnection can be detected by the IC chip 13 of the wireless IC tag 10. Thus, tampering of the container can be detected and stored in the IC chip 13. Since the first linear wiring 16a and the second linear wiring 16b are disposed on opposite lateral sides of the neck 31, the wire break detection wiring 16 is disconnected with higher probability when the container is opened.

(Cap Seal 20)

As previously shown in FIG. 1, the cap seal 20 has a cup-like shape which includes the top face 22 that covers the wire break detection unit B2 of the wireless IC tag 10 positioned on the sealing member 32, and the cylindrical member 21 having a cylindrical shape surrounding the neck 31 of the container body 30. In other words, the top face 22 is connected to one of two axial ends of the cylindrical member 21 and closes the cylindrical member 21 at the axial end of the cylinder to form the top of the cap seal 20. In the cylindrical member 21, one of the axial ends of the cylinder, which is connected to the top face 22, is a first end, and the other axial end on a side opposite to the first end is a second end.

[Cylindrical Member]

The cylindrical member 21 includes a metal section 21a surrounding the container body 30, and an insulating section 21b of a strip shape extending in the axis direction of the cylindrical member 21. The length of the cylindrical member 21 varies depending on the length of the neck 31 of the container body 30, and is approximately from 50 mm to 70 mm in the case of a container body 30 for wine or brandy.

The metal section 21a is formed of a sheet of metal extended by rolling or the like, and is disposed on the side face of the neck 31 of the container body 30. The metal section 21a may be made of metals including, but not limited to, aluminum, tin, and the like. The metal section 21a is a single sheet member, and is wrapped once around the container body 30 in the circumferential direction of the cylindrical member 11, ending at the position of the insulating section 21b.

The insulating section 21b is made of a resin that is an insulating adhesive. Examples of such a resin include epoxy resins and silicone resins. In particular, epoxy resins, which have high insulation properties, are preferably used as a material for the insulating section 21b. The insulating section 21b preferably has a resistivity of $10^6 \Omega m$ or more.

The insulating section 21b linearly extends from one end to the other end of the cylindrical member 21. That is, the insulating section 21b extends between two axial ends of the cylindrical member 21.

Figure 9:
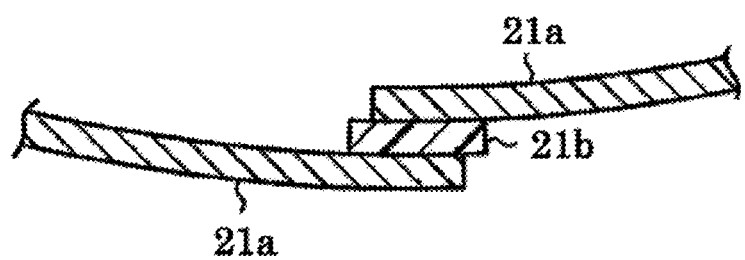
FIG. 9 is a cross-sectional view in the vicinity of an insulating section in a cap seal of the first embodiment.

FIG. 9 illustrates a cross-sectional structure in the radial direction of the cylindrical member 21 at the vicinity of the insulating section 21b. As shown in FIG. 9, the metal section 21 has two ends in the circumferential direction of the cylindrical member 21, both adhered to the insulating section 21b. These two ends of the metal section 21a are overlapped with each other with the insulating section 21b interposed therebetween. These two ends are insulated from each other by the insulating section 21b. Thus, with the metal section 21a and the insulating section 21b being joined to each other, a closed annular shape is formed in the circumferential direction of the cylindrical member 21.

As seen from the outside of the cylindrical member 21, the insulating section 21b preferably extends beyond the end of the metal section 21a in the circumferential direction of the cylindrical member 21. Also, as seen from the inside of the cylindrical member 21, the insulating section 21b preferably extends beyond the end of the metal section 21a in the circumferential direction of the cylindrical member 21. With this configuration, both ends of the metal section 21a can be reliably prevented from being brought into contact with each other if the cylindrical member 21 is deformed during mounting of the cap seal 20 to the container.

According to the above configuration, a conductive path extending in the circumferential direction of the cylindrical member 21 in the metal section 21a is interrupted by the insulating section 21b. That is, conduction in the circumferential direction of the cylindrical member 21 is interrupted by the insulating section 21b. Thus, the inductance of the cylindrical member 21 can be reduced compared with the configuration in which a closed annular conductor path is formed in the cylindrical member 21. Accordingly, in contactless communication between the wireless IC tag 10 and external devices such as a reader device, influence of the cylindrical member 21 on the electromagnetic field in the wireless IC tag 10 can be reduced. As a result, communication characteristics such as communication distance of the wireless IC tag 10 can be reduced in or prevented from deteriorating.

The insulating section 21b may extend between two axial ends of the cylindrical member 21. The insulating section 21b may extend linearly in the extending direction of the cylindrical member 21, that is, in the axial direction of the cylindrical member 21, or may have another configuration. For example, as seen from the outside of the cylindrical member 21, the insulating section 21b may extend obliquely relative to the extending direction of the cylindrical member 21, or may extend in a curved manner, or may draw a pattern.

In addition, configuration of the connection between the cylindrical member 21 and the top face 22 is not specifically limited. For example, an end of the cylindrical member 21 may be bent radially inward, and the top face 22 may be bonded to the bent portion so as to be internal or external to the cylindrical member 21. Alternatively, the end of the top face 22 may be extended in the axial direction of the cylindrical member 21, and the inner or outer surface of the cylindrical member 21 may be bonded to the extended portion.

[Modifications]

The positional relationship between the metal section 21a and the insulating section 21b is not limited to one described above, and may be as shown in FIG. 10. That is, both ends of the metal section 21a are arranged side by side in the circumferential direction of the cylindrical member 21 on the front surface of the insulating section 21b. As long as two ends are spaced apart from each other, a clearance between these ends may be filled with the insulating section 21b, or may be left without being filled.

With this configuration, as seen from the outside of the cylindrical member 21, the insulating section 21b is interposed between both ends of the metal section 21a in the circumferential direction of the cylindrical member 21. In short, the metal section 21a and the insulating section 21b may be joined to each other so that conduction in the circumferential direction of the cylindrical member 21 is interrupted by the insulating section 21b.

Further, a plurality of insulating sections 21b may be arranged side by side in the circumferential direction of the cylindrical member 21. That is, the metal section 21*a* is divided into a plurality of segments in the circumferential direction of the cylindrical member 21, and a closed annular shape is formed when ends of two adjacent segments of the metal section 21*a* are adhered to the insulating section 21*b*. In other words, a plurality of insulating sections 21*b* are provided, and the segments of the metal section 21*a* and the insulating sections 21*b* are arranged such that two segments of the metal section 21*a* adjacent to each other in the circumferential direction of the cylindrical member 21 are joined to each other by the insulating sections 21*b*.

According to such a configuration in which the metal section 21*a* is divided into a plurality of segments for insulation, a conductive path extending in the circumferential direction of the cylindrical member 21 is divided into smaller segments. Accordingly, communication characteristics of the wireless IC tag 10 can be further prevented from being reduced due to the influence of the metal section 21*a*.

(Attachment of Cap Seal 20 to Container)

An exemplary procedure for attaching the cap seal 20 to the container will be described below. First, as previously shown in FIG. 2, the wire break detection unit B2 is bonded to the sealing member 32 while allowing the wireless IC tag 10 to be positioned on the container body 30 and the sealing member 32.

Meanwhile, the cylindrical member 21 and the top face 22 are joined to each other to assemble the cap seal 20. The cylindrical member 21 of the cap seal 20 is capped over the sealing member 32 and the neck 31, and the wireless IC tag 10 positioned thereon. Then, the cylindrical member 21 of the cap seal 20 is fitted onto the container body 30 by rolling performed by crimping or the like.

FIG. 1 illustrates an example in which the cap seal 20 is rolled and fitted onto the container body 30. The wire break detection unit B of the wireless IC tag 10 is sandwiched between the inner surface of the cap seal 20 and the outer peripheral surface of the container body 30, and covered with the cap seal 20. The inlet A of the wireless IC tag 10 is at least partially exposed from the cap seal 20. In particular, the jumper wire 15 and the IC chip 13 of the inlet A are exposed from the cap seal 20.

Since the cap seal 20 covers the wire break detection unit B of the wireless IC tag 10, the wire break detection unit B is torn together with the cap seal 20 when the container body 30 is opened. Further, since the inlet A of the wireless IC tag 10, in particular, the jumper wire 15 and the IC chip 13, are exposed from the cap seal 20, the jumper wire 15 and the IC chip 13 can be prevented from being damaged by stress applied when the metal cap seal 20 is rolled and fitted onto the container.

Alternatively, assembly of the cap seal 20 may also be performed in parallel with attachment of the cap seal 20 to the container. For example, the cap seal 20 may also be assembled by inserting the neck 31 of the container body 30 into the cylindrical member 21 and then joining the top face 22 to the cylindrical member 21.

Alternatively, the cap seal 20 may also be assembled by wrapping the metal section 21*a* around the neck 31 of the container body 30, and then adhering the ends of the metal section 21*a* via the insulating section 21*b* to form the cylindrical member 21, which in turn is joined to the top face 22.

Alternatively, the cap seal 20 may also be attached to the container after the wireless IC tag 10 is pre-adhered to the inner surface of the cap seal 20.

In addition, a layer such as a protective layer may also be laminated on the inlet A of the wireless IC tag 10, which is exposed from the cap seal 20, to protect the wireless IC tag 10 from external factors.

As described above, according to the above embodiment, the following advantageous effects can be obtained.

(1) The container with a wireless IC tag is configured such that, when the cap seal 20 is torn and removed from the container, the wire break detection unit B of the wireless IC tag 10 is also torn together with the cap seal 20 to cause the wire break detection wiring 16 to be disconnected. Then, the IC chip 13 of the wireless IC tag 10 detects and stores the disconnection of the wire break detection unit B, and stores that the container has been opened. Thus, open state of the container can be managed via communication with the wireless IC tag 10 before and after the container is opened. Further, since the wire break detection unit B of the wireless IC tag 10 is covered with the cap seal 20 and torn together with the cap seal 20, counterfeiting by removing only the wireless IC tag 10 from the container and attaching it to a counterfeit container is difficult.

(2) Even when the contents are replaced by piercing the needle N into the sealing member 32, the dense wiring 17 of the wire break detection unit B2 sandwiched between the sealing member 32 and the top face 22 of the cap seal 20 undergoes disconnection. The wireless IC tag 10 can detect the disconnection of the wire break detection unit B2 and store that the container has been opened to thereby detect and store that the contents has been replaced.

(3) The IC chip 13 is exposed from the lower end of the cylindrical member 21 of the cap seal 20, and extends along the outer peripheral surface of the container body 30. Accordingly, compared with a conventional configuration in which the top face 22 and the wireless IC tag are overlapped with each other and the wireless IC tag is positioned on the center axis of the coil, which is formed by the cylindrical member 21, influence of the cap seal 20 on the electromagnetic field can be reduced in the wireless IC tag 10. As a result, communication characteristics of the wireless IC tag 10 can be reduced in or even prevented from deteriorating.

(4) Since the IC chip 13 is exposed from the cap seal 20, a pressure applied when the cap seal 20 is attached to the container is minimized. Accordingly, a decrease in function of the IC chip 13 can be minimized. Further, since the jumper wire 15 is exposed from the cap seal 20, deformation of the jumper wire 15 due to a pressure applied when the cap seal 20 is attached to the container is minimized. Accordingly, conduction by the communication antenna can be prevented from being interrupted.

(5) Since the conduction in the circumferential direction of the metal section 21*a* of the cylindrical member 21 is interrupted by the insulating section 21*b*, inductance in the cylindrical member 21 can be reduced compared with the configuration in which a closed annular conductor path is formed in the cylindrical member 21. Accordingly, in contactless communication between the wireless IC tag 10 and an external device via the communication antenna of the inlet A, the communication characteristics of the wireless IC tag 10 can be reduced in or prevented from deteriorating.

Figure 10:
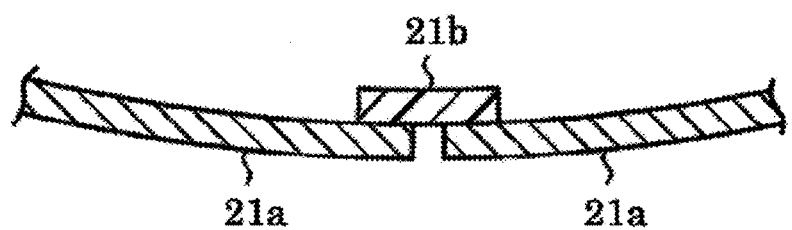
FIG. 10 is a cross-sectional view in the vicinity of an insulating section in a cap seal of a modification of the first embodiment.

(6) According to the configuration shown in FIG. 9, in which the insulating section 21*b* is interposed between the ends of the metal section 21*a* in the radial direction of the cylindrical member 21, or the configuration shown in FIG. 10, in which the insulating section 21*b* is interposed between the ends of the metal section 21*a* in the circumferential direction of the cylindrical member 21 as seen from the outside of the cylindrical member 21, the conduction described above can be favorably interrupted by the insulating section 21b.

In particular, in the configuration shown in FIG. 9, in which the insulating section 21b is interposed between two ends of the metal section 21a at a position where these two ends are overlapped with each other, the strength of the cylindrical member 21 can be enhanced due to the ends of the metal section 21a being overlapped with each other. Moreover, if the insulating section 21b is formed of an adhesive having insulation properties, production of the cylindrical member 21 is facilitated.

Further, in the configuration shown in FIG. 10, in which a single metal section 21a is wound to form a cylindrical shape, and both ends of the metal section 21a in the circumferential direction of the cylindrical member 21 are joined to each other by the insulating section 21b made of an insulating adhesive, the following advantageous effects can be obtained. That is, since the cylindrical shape can be formed without overlapping the ends of the metal section 21a by connecting the ends of the metal section 21a forming the cylindrical member 21 via the insulating section 21b made of an insulating adhesive, the cylindrical member 21 having the insulating section 21b can be achieved with a simple configuration. Accordingly, the production efficiency of the cylindrical member 21 can also be improved.

(7) Since heating is not necessary in attachment of the cap seal 20 to the container 30, the contents of the container can be prevented from being deteriorated due to heating. This is particularly beneficial to the case where the contents are alcoholic beverages such as wine.

Second Embodiment

Figure 11:
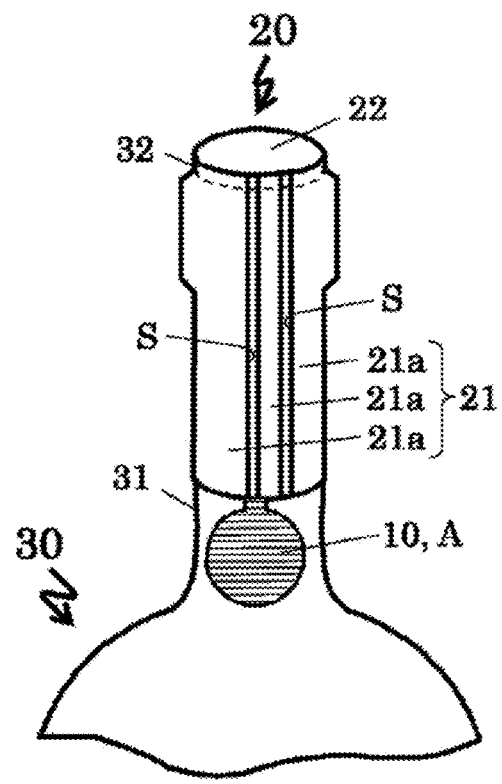
FIG. 11 is a perspective view illustrating a structure of a container with a wireless IC tag according to a second embodiment.
Figure 12:
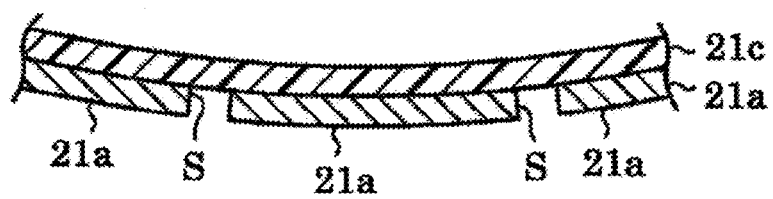
FIG. 12 is a cross-sectional view in the vicinity of an insulating section in a cap seal of the second embodiment.

As shown in FIGS. 11 and 12, a second embodiment of a container with a wireless IC tag, and a wireless IC tag will be described. The following will be described focusing on the difference from the first embodiment, and configuration that is the same as that of the first embodiment will be referred to by the same reference numbers and the description thereof will be omitted.

As shown in FIGS. 11 and 12, the second embodiment differs from the first embodiment in the configuration of the cap seal 20.

The cap seal 20 of the second embodiment includes the cylindrical member 21 and the top face 22. The configuration of the top face 22 is the same as that of the first embodiment. The cylindrical member 21 of the cap seal 20 of the second embodiment is formed of a composite sheet having a multilayer configuration made of an insulation layer and a metal layer, in which the metal layer is divided into a plurality of metal sections 21a.

The adjacent metal sections 21a are separated from each other in the circumferential direction of the cylindrical member 21 by a clearance S, which extends between two axial ends of the cylindrical member 21. The clearance S extends from one of the axial ends to the other of the cylindrical member 21. An insulation layer 21c is one continuous layer without being divided by any clearance S. The clearance S divides the metal section 21a on the insulating layer 21c. When two or more clearances S are formed, each metal section 21a is provided by being sandwiched between two clearances S.

The clearance S may extend between two axial ends of the cylindrical member 21. The clearance S may extend linearly in parallel with the axial direction of the cylindrical member 21, or may extend in a direction inclined relative to the axial direction. For example, as seen from the outside of the cylindrical member 21, the clearance S may extend in a direction inclined relative to the axial direction of the cylindrical member 21 by a predetermined angle, or may extend in a curved manner with the inclination angle varying with position, or may draw a pattern.

The clearance S that divides the metal section 21a on the insulation layer 21c can be formed by, for example, etching a metal layer on a composite sheet in which the metal layer is laminated on an insulation layer to thereby divide the metal layer into a plurality of metal sections 21a.

As shown in FIG. 12, the metal section 21a is positioned further radially outside the cylindrical member 21 than the insulation layer 21c is. That is, the metal section 21a is visible when viewed from the outside of the cylindrical member 21. The insulation layer 21c is in contact with the container body 30 and the wireless IC tag 10 inside the metal section 21a.

The insulation layer 21c is made of an insulating resin. Examples of the insulating resin include epoxy resins, silicone resins, polyvinyl chloride resins, and polyethylenes. The insulating resin 21 preferably has a resistivity of $10^6 \Omega m$ or more. The metal section 21a may be made of, for example, aluminum, tin, or copper.

Both circumferential ends of the cylindrical member 21, that is, both ends of the composite sheet may be adhered to each other via the insulating section 21b made of an insulating adhesive similarly to the first embodiment, or may be joined to each other using other methods than adhesion via the insulating section 21b made of an insulating adhesive.

In the cap seal 20 of the second embodiment, a portion of the insulating layer 21c located at a position facing the clearance S and connecting the ends of the adjacent metal sections 21a, which are separated by the clearance S, is an interstitial insulating section, which is an example of the insulating section. The metal sections 21a and the interstitial insulating sections joined to each other form a closed annular shape in the circumferential direction of the cylindrical member 21. As seen from the outside of the cylindrical member 21, the interstitial insulating sections are interposed between the ends of the adjacent metal sections 21a, which are arranged side by side in the circumferential direction of the cylindrical member 21.

In the above configuration, conduction in the circumferential direction of the cylindrical member 21 is interrupted by the interstitial insulating section. Thus, deterioration in communication characteristics of the wireless IC tag 10 can be reduced or minimized compared with the configuration in which a closed annular conductor path is formed in the cylindrical member 21.

Further, in a configuration shown in FIGS. 11 and 12 in which a plurality of clearances S are provided, the conductor path extending in the circumferential direction of the cylindrical member 21 is more finely interrupted compared with the configuration in which one clearance S is provided. As a result, inductance of the cylindrical member 21 can be even more reduced and thus deterioration in communication characteristics of the wireless IC tag 10 is even more decreased. If patterning is used for the metal section 21a of the composite sheet, a plurality of clearances S can be easily formed.

Further, in order to facilitate tearing of the wire break detection unit B1 or the wire break detection unit B3 of the wireless IC tag 10 when the cap seal 20 is torn at the clearance S, the wire break detection unit B1 or the wire break detection unit B3 may also be formed to have a portion which intersects the clearance S when viewed from the outside of the cylindrical member 21 and the portion may be adhered to the inner surface of the cap seal 20 at a position where the clearance S is located.

As described above, according to the second embodiment, the following advantageous effects can be obtained in addition to the advantageous effects (1) to (5) and (7) of the first embodiment.

(8) Since the metal sections 21a are separated by the clearance S on the insulating layer 21c, conduction in the circumferential direction of the cylindrical member 21 is interrupted by an insulating section. With this configuration, the position, size, and shape of the insulating section can be adjusted by setting the position, size, and shape of the clearance S. Thus, the position, size, and shape of the insulating section are easily adjusted with a higher degree of freedom.

(9) In a configuration in which a plurality of insulating sections are provided by a plurality of clearances S, the conductor path extending in the circumferential direction of the cylindrical member 21 is even more finely interrupted, and thus deterioration in communication characteristics of the wireless IC tag 10 is even more decreased.

Third Embodiment

Figure 13:
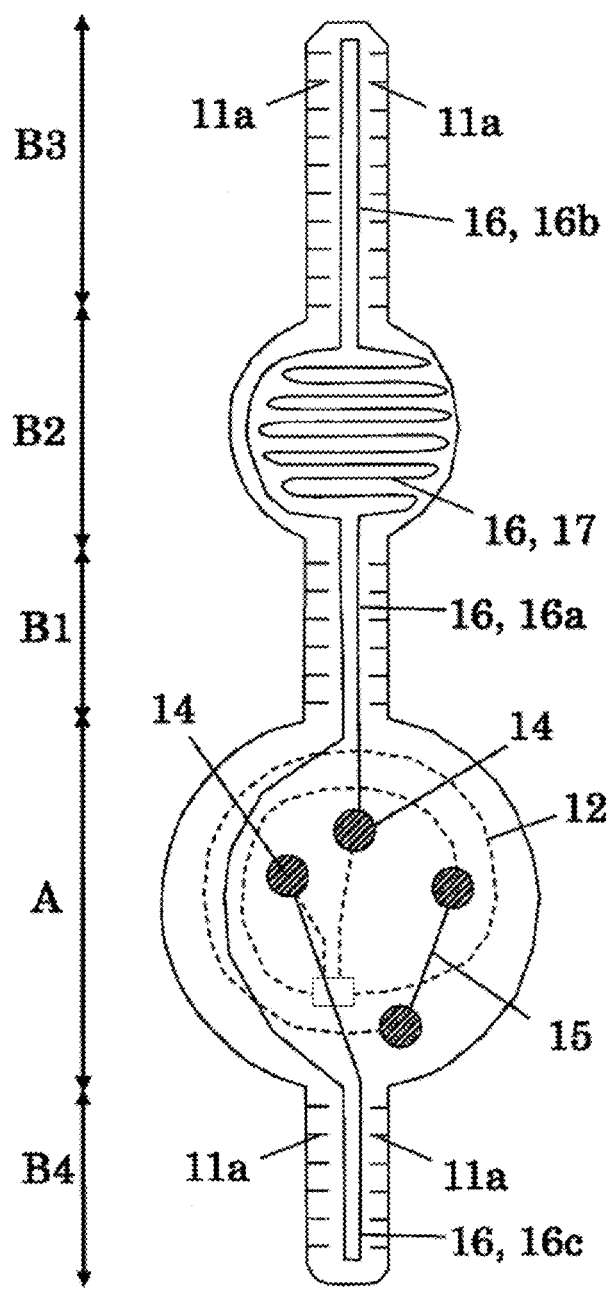
FIG. 13 is a plan view of a wiring pattern on a rear surface of a wireless IC tag of a third embodiment.

With reference to FIG. 13, a third embodiment of a container with a wireless IC tag, and a wireless IC tag will be described. The following will be described focusing on the difference from the first embodiment, and configuration that is the same as that of the first embodiment will be referred to by the same reference numbers and the description thereof will be omitted.

FIG. 13 illustrates a wiring pattern on the rear surface of the wireless IC tag 10 of the third embodiment. As shown in FIG. 13, the wireless IC tag 10 of the third embodiment includes a wire break detection unit B4, the inlet A, the wire break detection unit B1, the wire break detection unit B2 to be disposed on the sealing member 32, and the wire break detection unit B3, which are connected in this order.

That is, the third embodiment differs from the first embodiment in that the inlet A is interposed between the wire break detection unit B4 and the wire break detection unit B1 in the extending direction of the wireless IC tag 10. Further, in the third embodiment, the cylindrical member 21 of the cap seal 20 has an opening. The cap seal 20 is attached to the container with the inlet A exposed from the opening.

The wire break detection unit B4 is adhered to the inner surface of the cap seal 20. When the cap seal 20 is torn and removed from the container, the wire break detection unit B4 is also torn together with the cap seal 20 to cause the wire break detection wiring 16 to be disconnected. The wire break detection unit B4 includes a third linear wiring 16c that constitutes the wire break detection wiring 16.

According to the third embodiment, when the cap seal 20 is torn and removed from the container, the wire break detection unit B4 is also torn together with the wire break detection units B1 and B3, which improves reliability in detection of tampering of the container.

In addition, the cap seal 20 of the first embodiment or the cap seal 20 of the second embodiment may also be applied to the cap seal 20.

Fourth Embodiment

With reference to FIGS. 14 to 17, a fourth embodiment of a container with a wireless IC tag, and a wireless IC tag will be described. The following will be described focusing on the difference from the first embodiment, and configuration that is the same as that of the first embodiment will be referred to by the same reference numbers and the description thereof will be omitted.

The fourth embodiment differs from the first embodiment in that the wire break detection unit B2 having the dense wiring 17 is integrated with the inlet A.

Figure 14:
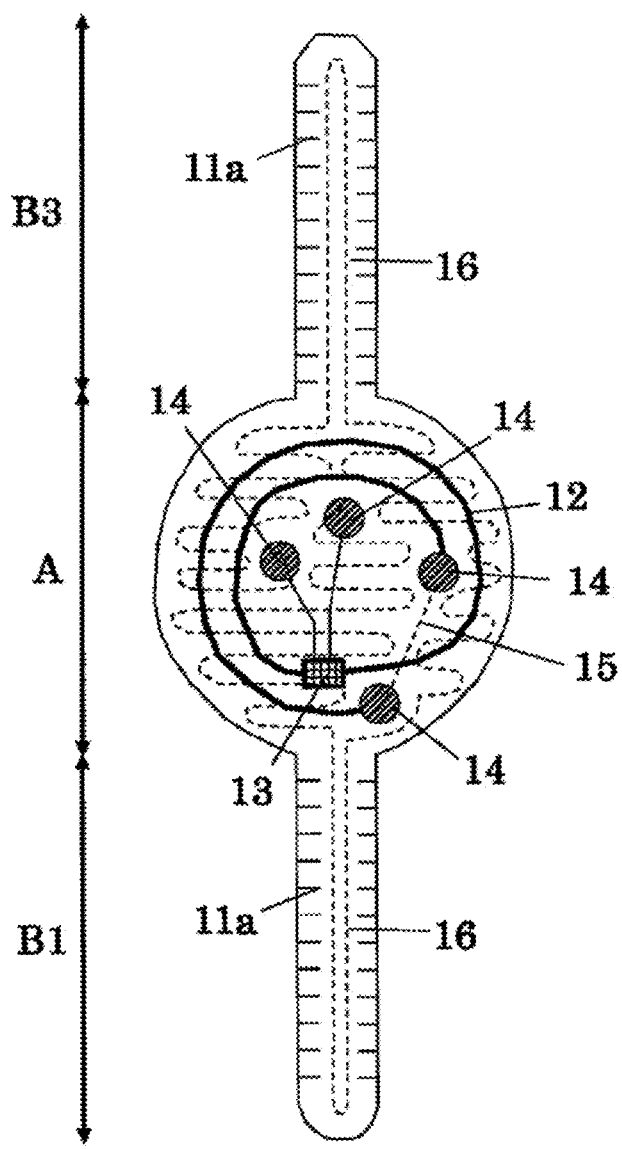
FIG. 14 is a plan view of a wiring pattern on a front surface of a wireless IC tag of a fourth embodiment.
Figure 15:
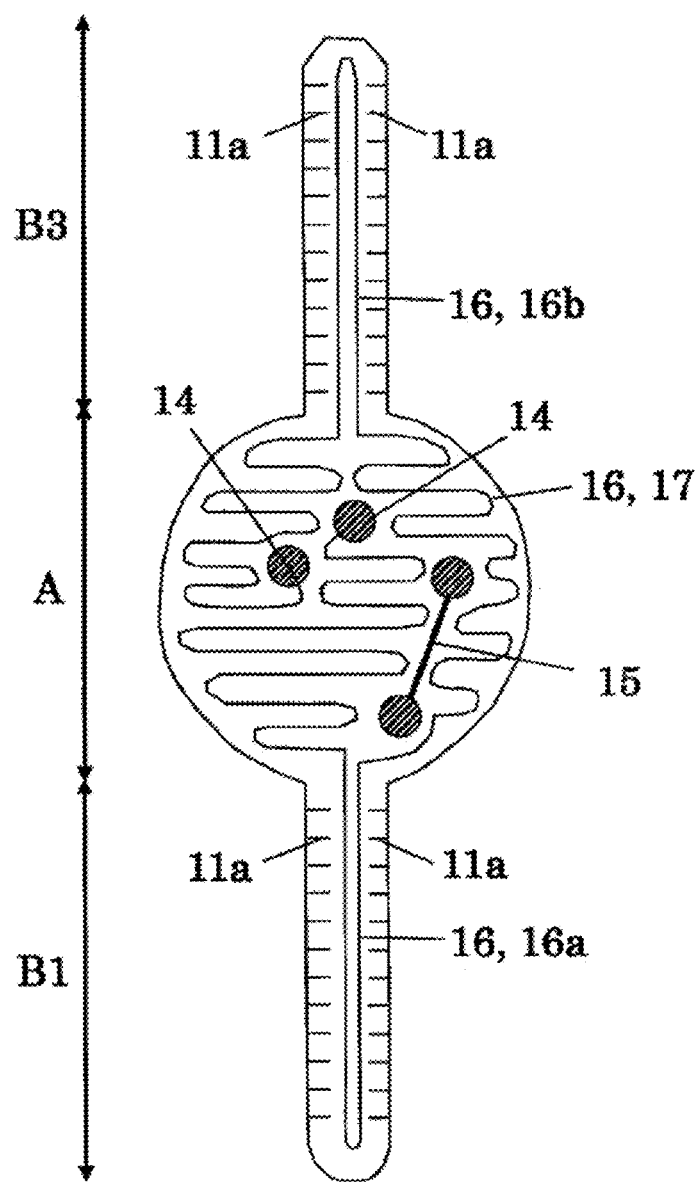
FIG. 15 is a plan view of a wiring pattern on a rear surface of a wireless IC tag of the fourth embodiment.

FIG. 14 illustrates a wiring pattern on the front surface of the wireless IC tag 10 of the fourth embodiment and a wiring pattern on the rear surface in a see-through view. FIG. 15 illustrates a wiring pattern on the rear surface of the wireless IC tag 10 of the fourth embodiment. The antenna coil 12 as a coil section constituting the inlet A is disposed on the front surface of the substrate 11 as shown in FIG. 14, and the dense wiring 17 is disposed on the rear surface of the substrate 11 as shown in FIG. 15.

Figure 16:
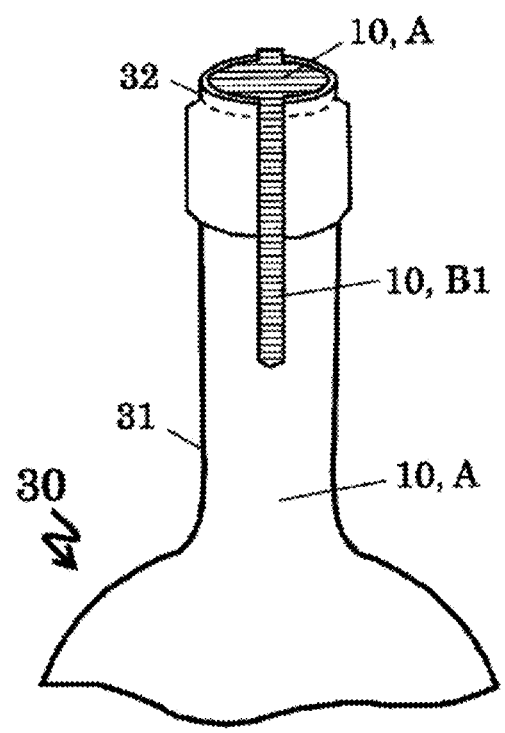
FIG. 16 is a view illustrating a structure in which a wireless IC tag is disposed on a container of the fourth embodiment.

FIG. 16 illustrates that the wireless IC tag 10 is attached to the container. As shown in FIG. 16, the wireless IC tag 10 extends from one side on the neck 31 to the other side on the neck 31 across the sealing member 32. A portion of the wireless IC tag 10 in which the antenna coil 12 and the dense wiring 17 are located is bonded to the sealing member 32.

Figure 17:
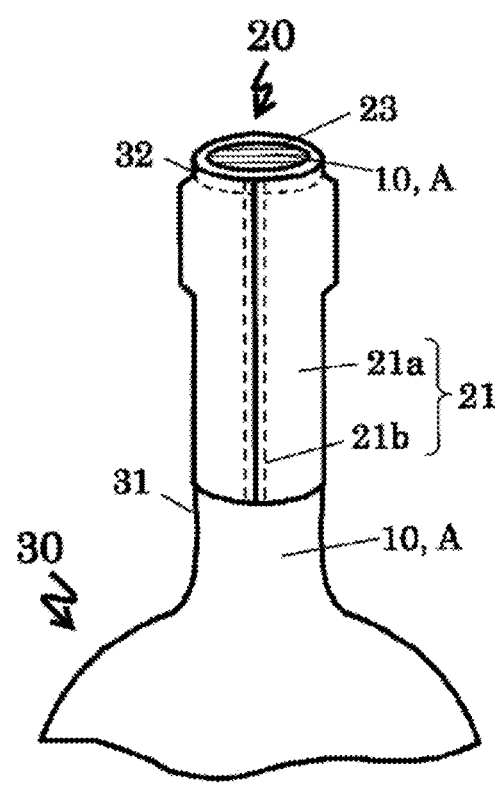
FIG. 17 is a perspective view illustrating a structure of a container with a wireless IC tag according to the fourth embodiment.

FIG. 17 illustrates that the cap seal 20 covers the neck 31 of the container body 30 and the wireless IC tag 10 disposed on the neck 31. That is, the wireless IC tag 10 is sandwiched between the cap seal 20 and the container body 30. The cap seal 20 has a top opening 23 on the top. A configuration of the cylindrical member 21 is the same as that of the first embodiment. The inlet A of the wireless IC tag 10 is exposed through the top opening 23 of the cap seal 20.

Specifically, the top opening 23 exposes a portion of the inlet A of the wireless IC tag 10 inside the inner diameter of the antenna coil 12, in other words, an inner area of the loop formed by the antenna coil 12. It was found that exposing a portion of the inlet A inside the inner diameter of the antenna coil 12 reduces influence of the cap seal 20 on the electromagnetic field for contactless communication by the antenna coil 12, and thus reduces influence on the communication characteristics of the wireless IC tag 10. The portion of the wireless IC tag 10 which is located in the top opening 23 includes the IC chip 13. That is, in the fourth embodiment as well, the IC chip 13 is exposed from the cap seal 20. Moreover, the jumper wire 15 may also be exposed from the cap seal 20. Due to the inlet A not overlapping the metal top face, communication characteristics of the wireless IC tag 10 are reduced in or even prevented from deteriorating.

According to the fourth embodiment, a conductive path extending in the circumferential direction of the cylindrical member 21 in the cap seal 20 is interrupted by the insulating section 21b as in the first embodiment. Since an induced current parallel to the antenna coil 12 of the inlet A is prevented from flowing in the cap seal 20, communication characteristics of the wireless IC tag 10 can be reduced in or prevented from deteriorating. In addition, the configuration of the cap seal 20 of the second embodiment can also be applied to the cap seal 20 of the fourth embodiment In the fourth embodiment, in which the dense wiring 17 is disposed on the back side of the inlet A, the dense wiring 17 or the antenna coil 12 is disconnected when a cylindrical needle N is pierced into the sealing member 32 and the contents are replaced with counterfeit drink via the needle N as in the first embodiment shown in FIG. 8. Thus, the IC chip 13 can detect and store that the contents in the container body 30 has been replaced.

Other Embodiments

The embodiments described above can be modified and implemented as follows.

In the substrate 11 of the wireless IC tag 10, the IC chip 13 is disposed on a surface facing away from the container body 30. However, the IC chip 13 may also be disposed on a surface facing the container body 30. Further, the antenna coil 12 may be disposed on either a surface of the substrate 11 facing the container body 30 or a surface facing away from the container body 30. That is, either the first surface on which the antenna coil 12 is disposed or the second surface on which the jumper wire 15 is disposed may be a surface facing the container body 30. Further, the wire break detection wiring 16 may also be disposed on either surface of the substrate 11.

Depending on the applications of the wireless IC tag 10 and the container, it is also possible to provide a layer imparting durability to the wireless IC tag 10, a layer imparting stability, a layer imparting brittleness, or a protective layer or the like on the front surface of the inlet A of the wireless IC tag 10 or between the wireless IC tag 10 and the container body 30.

The material or the shape of the insulating section may be different from the material or the shape exemplified in the above embodiments as long as two axial ends of the cylindrical member 21 are connected by the insulating section of the cap seal 20, and a closed annular shape extending in the circumferential direction of the cylindrical member 21 is formed by the metal section and the insulating section joined to each other such that conduction in the circumferential direction of the cylindrical member 21 is interrupted.

The cap seal 20 may not necessarily include an insulating section. That is, the entire cylindrical member 21 may also be made of a metal. With this configuration as well, compared with conventional configuration in which the metal top face and the inlet A are overlapped with each other and the inlet A is positioned on the center axis of the coil formed by a metal cylindrical member, communication characteristics of the wireless IC tag 10 can be reduced in or prevented from deteriorating as long as the IC chip 13 of the inlet A is exposed from the cap seal 20.

As long as an opening is provided, the container body 30 is not particularly limited in shape or material thereof. When the container body 30 is made of a brittle material such as glass, the strength near the opening of the container body 30 tends to be lowered. However, with the cap seal 20 of the above embodiments being attached, the vicinity of the opening can be protected by the metal portion. In other words, the cap seal 20 exerts an effect of protecting the vicinity of the opening portion.

The configurations of the wireless IC tag 10 of the aforementioned embodiments may also be applied to a container with a wireless IC tag having the cap seal 20 made of a material other than metals. Further, a wireless IC tag which does not include a wire break detection unit may also be applied to the container with a wireless IC tag of the fourth embodiment, that is, a container with a wireless IC tag in which at least an inner area of the antenna coil 12 in the inlet A is exposed through the top opening 23 of the cap seal 20.

EXAMPLES

Figure 18:
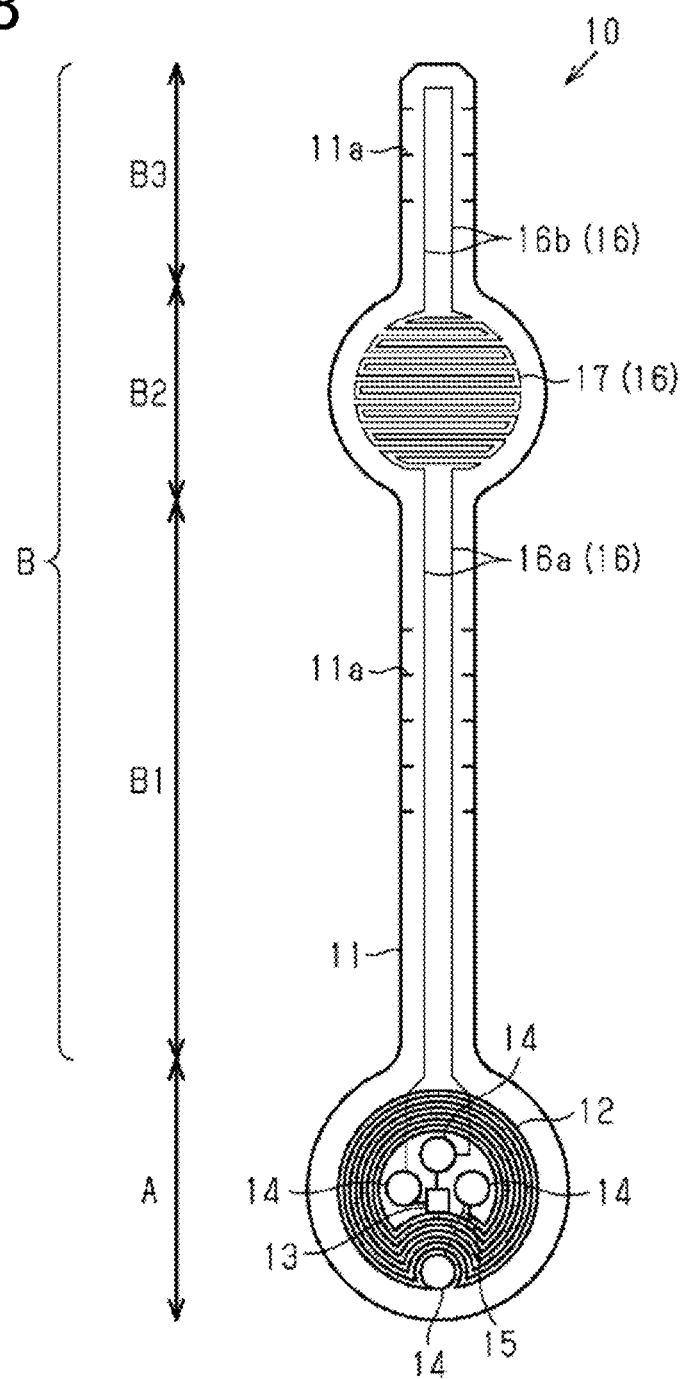
FIG. 18 is a view illustrating a planar structure of a wireless IC tag of an example.
Figure 19:
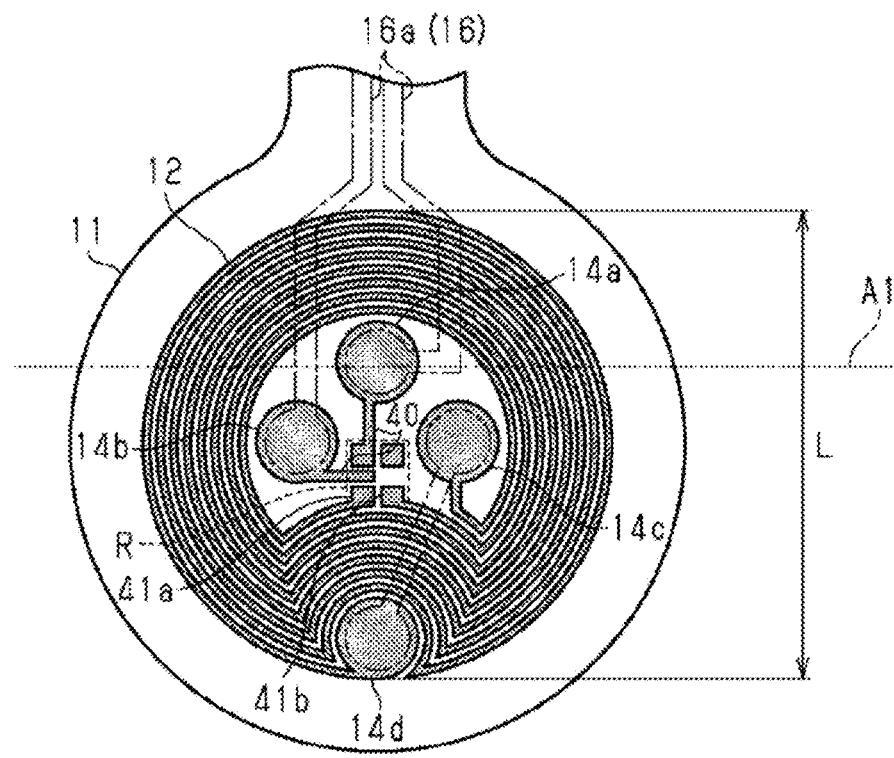
FIG. 19 is an enlarged view of a wiring pattern of an inlet in a wireless IC tag of an example.
Figure 20:
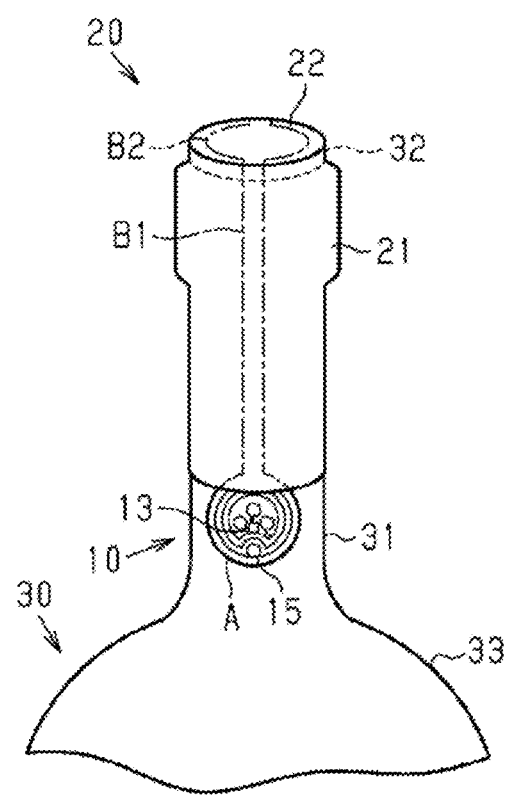
FIG. 20 is a perspective view illustrating a structure of a container with a wireless IC tag of an example.

With reference to FIGS. 18 to 20, a specific example of the first embodiment will now be described.

As shown in FIG. 18, the wireless IC tag 10 includes the inlet A and the wire break detection unit B. The wire break detection unit B is composed of the wire break detection unit B1, the wire break detection unit B2, and the wire break detection unit B3. The wire break detection unit B2 is interposed between the wire break detection unit B1 and the wire break detection unit B3 in the extending direction of the wireless IC tag 10. The substrate 11 has a disc shape at a position where the wire break detection unit B2 is located and a strip shape extending in the extending direction of the wireless IC tag 10 at positions where the wire break detection unit B1 and the wire break detection unit B3 are respectively located. In the extending direction of the wireless IC tag 10, the wire break detection unit B1 is longer than the wire break detection unit B3. In the wire break detection unit B1 and the wire break detection unit B3, a plurality of slits 11a extending inward from the edge of the substrate 11 are formed in the substrate 11.

In FIG. 18, the wiring located on the front surface of the substrate 11 is indicated by the thick line, and the wiring located on the rear surface of the substrate 11 is indicated by the thin line. The wire break detection wiring 16 included in the wire break detection unit B is positioned on the rear surface of the substrate 11, that is, the surface facing the container body 30. The wire break detection wiring 16 is a continuous wire including the first linear wiring 16a constituting the wire break detection unit B1, a dense wiring 17 constituting the wire break detection unit B2, and the second linear wiring 16b constituting the wire break detection unit B3. The first linear wiring 16a and the second linear wiring 16b each extend forward and backward in the extending direction of the wireless IC tag 10 on the substrate 11, and the dense wiring 17 curves, for example, in a meandering pattern. Two ends of the wire break detection wiring 16 each extend from the first linear wiring 16a to the rear surface of a portion of the substrate 11 which forms the inlet A and is connected to the penetrating connection conductor 14.

The inlet A is located on a side of the wire break detection unit B1 on which the wire break detection unit B2 is not located. The substrate 11 has a disc shape at a position where the inlet A is located. In other words, the width of the substrate 11 is larger in the inlet A than in the wire break detection unit B1. The inlet A includes a communication antenna and the IC chip 13. The communication antenna has a configuration in which the antenna coil 12 and the jumper wire 15 are connected to each other via the penetrating connection conductor 14. The IC chip 13 and the antenna coil 12 are disposed on the front surface of the substrate 11, that is, on the surface facing away from the container body 30. The jumper wire 15 is disposed on the rear surface of the substrate 11. The penetrating connection conductor 14 penetrates through the substrate 11 to electrically connect the wiring on the front surface and the wiring on the rear surface of the substrate 11 to each other.

In the above configuration, the wire break detection unit B1 and the inlet A constitute a first extending portion that extends from the wire break detection unit B2, and the wire break detection unit B3 constitutes a second extending portion that extends from the wire break detection unit B2 in a direction away from the first extending portion. The first extending portion has a length larger than the axial length of the cylindrical member 21 of the cap seal 20. The IC chip 13 and the jumper wire 15 are disposed in a tip region of the first extending portion.

With reference to FIG. 19, a configuration of the wiring in the inlet A will be described. In FIG. 19, wiring located on the front surface of the substrate 11 is indicated by dots, and wiring located on the front surface of the substrate 11 is indicated by hollow lines with a single dot-and-dash line. Further, a region in which the IC chip 13 is positioned is indicated by a region R surrounded by the dotted line. Wirings located on the front surface of the base material 11 are indicated by dots, and wirings located on the back surface of the base material 11 are indicated by hollow lines with a single-dot chain line.

In FIG. 19, circular wiring regions are portions formed by the penetrating connection conductor 14. Four penetrating connection conductors 14 include a connection conductor 14a connected to one end of the wire break detection wiring 16, and a connection conductor 14b connected to the other end of the wire break detection wiring 16. The connection conductor 14a and the connection conductor 14b are electrically connected to the electrode terminals for container tamper detection unit of the IC chip 13 via auxiliary wirings 40, which extend from the connection conductor 14a and the connection conductor 14b on the front surface of the substrate 11.

The four penetrating connection conductors 14 further include a connection conductor 14c and a connection conductor 14d which connect the antenna coil 12 and the jumper wire 15.

The antenna coil 12 has a loop shape connecting between a terminal end 41a and a terminal end 41b, which are two ends connected to the electrode terminals for contactless communication unit of the IC chip 13, and a structure in which the wiring routed in a loop shape is discontinuous between the connection conductor 14c and the connection conductor 14d on the front surface of the substrate 11. The terminal ends 41a and 41b, and the connection conductor 14c are located inside the innermost circle of the loop formed by the antenna coil 12, and face the inner region of the antenna coil 12. The connection conductor 14d is located at the outermost circle of the loop formed by the antenna coil 12, and face the outer region of the antenna coil 12. Further, the connection conductor 14a, the connection conductor 14b, and the IC chip 13 are located at the inner region of the antenna coil 12.

The jumper wire 15 overlaps the antenna coil 12 via the substrate 11. Specifically, the jumper wire 15 is located at a position connecting the disconnected portion of the antenna coil 12 via the substrate 11, that is, a position connecting the connection conductor 14c and the connection conductor 14d. The connection conductor 14c is connected to one of the disconnected portions of the antenna coil 12 and one end of the jumper wire 15, and the connection conductor 14d is connected to the other of the disconnected portions of the antenna coil 12 and the other end of the jumper wire 15. Thus, electrical conduction is established between the terminal end 41a and the terminal end 41b.

The jumper wire 15 extends from a lower end of the antenna coil 12, that is, an end of the antenna coil 12 located at a position opposite to the wire break detection unit B, toward the inner area of the antenna coil 12. When the length from the lower end to the upper end of the antenna coil 12 is defined as the total length L of the antenna coil 12, the IC chip 13 and the jumper wire 15 are located in a range where the distance from the lower end of the antenna coil 12 is two thirds or less of the total length L in the extending direction of the wireless IC tag 10. FIG. 19 shows a reference line A1, which is a straight line extending in a direction perpendicular to the extending direction of the wireless IC tag 10 in a range where the distance from the lower end of the antenna coil 12 is two thirds or less of the total length L in the extending direction of the wireless IC tag 10. The IC chip 13 and the jumper wire 15 are located in a region closer to the lower end of the antenna coil 12 than the reference line A1 is. With this arrangement of the IC chip 13 and the jumper wire 15, the IC chip 13 and the jumper wire 15 are easily exposed from the cap seal 20 when the wireless IC tag 10 is attached to the container.

FIG. 20 illustrates that the wireless IC tag 10 is disposed to extend between opposite lateral sides of the neck 31 of the container body 30 via the sealing member 32. The cap seal 20 covers the container body 30, the sealing member 32, and the wireless IC tag 10. That is, the wireless IC tag 10 is partially sandwiched between the container and the cap seal 20. The cylindrical member 21 of the cap seal 20 does not include an insulating section, and the entire cylindrical member 21 is made of metal, that is, the entire cylindrical member 21 is a metal section. The rear surface of the wireless IC tag 10 is adhered to the container, and a portion of the front surface of the wireless IC tag 10 which is covered with the cap seal 20 is adhered to the inner surface of the cap seal 20.

The IC chip 13 and the jumper wire 15 in the inlet A are exposed from the cap seal 20. Specifically, the cylindrical member 21 of the cap seal 20 covers part of the antenna coil 12 at a position near the upper end of the antenna coil 12, and the entire inner region of the antenna coil 12, together with the IC chip 13 and the jumper wire 15, is exposed from the lower end of the cylindrical member 21. The lower end of the cylindrical member 21 is the second end, which is one of two axial ends of the cylindrical member 21 on a side opposite to the first end, to which the top face 22 is connected.

In the above configuration, a disc-shaped portion of the substrate 11 which constitutes the inlet A is partially covered with the cylindrical member 21. In other words, the boundary region between the strip shaped portion of the substrate 11 which constitutes the wire break detection unit B1 and the above disc-shaped portion are covered with the cylindrical member 21. Since the width of the substrate 11 varies greatly at the above boundary region, the substrate 11 tends to easily break. However, since the boundary region is covered with the cylindrical member 21, the substrate 11 is prevented from being broken and thus the inlet A is prevented from being torn.

Further, the inlet A is entirely located on the outer peripheral surface of the neck 31 of the container body 30 and does not extend to a shoulder 33, which is a portion of the container body 30 whose diameter increases from the neck 31. When the contents of the container body 30 is liquid such as a beverage, the liquid level of the contents is typically located near the shoulder 33. That is, when the inlet A is located on the outer peripheral surface of the shoulder 33, the probability that the contents are present on the back side of the inlet A is higher compared with the case where the inlet A is located on the outer peripheral surface of the neck 31. If liquid is present on the back side of the inlet A, the communication distance of the wireless IC tag 10 is reduced. In this example, since the inlet A is disposed to partially overlap the cylindrical member 21 without reaching the shoulder 33, reduction in communication distance of the wireless IC tag 10 is prevented.

Further, when a plurality of containers are arranged for storage or sale of the containers, the shoulders 33 of the adjacent containers may be in contact with each other. In this example, since the entire inlet A is located on the outer peripheral surface of the neck 31, the wireless IC tag 10 is prevented from being in contact with another container even if the shoulders 33 of the adjacent containers are in contact with each other. Therefore, it is possible to prevent the function of the wireless IC tag 10 from being reduced due to contact impact.

The inlet A is not limited to the above configuration, and may also extend to the shoulder 33. When a reader device is brought closer to the container to communicate the reader device and the wireless IC tag 10, a reader device can be easily brought closer to the wireless IC tag 10 in the configuration in which the inlet A is located on the outer peripheral surface of the shoulder 33 since the shoulder 33 expands outside more than the neck 31.

[Reference Signs List] 10 . . . Wireless IC tag; 11 . . . Substrate; 11a . . . Slit; 12 . . . Antenna coil; 13 . . . IC chip; 14, 14a, 14b, 14c, 14d . . . Penetrating connection conductor; 15 . . . Jumper wire; 16 . . . Wire break detection wiring; 16a . . . First linear wiring; 16b . . . Second linear wiring; 16c . . . Third linear wiring; 17 . . . Dense wiring; 20 . . . Cap seal; 21 . . . Cylindrical member 21a . . . Metal section; 21b . . . Insulating section; 21c . . . Insulation layer; 22 . . . Top face; 23 . . . Top opening 30 . . . Container body; 31 . . . Neck; 32 . . . Sealing member; 33 . . . Shoulder; A . . . Inlet; B, B1, B2, B3, B4 . . . Wire break detection unit; Dia . . . Diameter of needle; D1 . . . Wire-to-wire distance; D2 . . . Second distance; N . . . Needle; S . . . Clearance; W . . . Wiring width

What is claimed is:

1. A container with a wireless IC tag, comprising:

a container having a container body and a sealing member for sealing an opening portion of the container body; and a wireless IC tag and a cap seal attached to the container, wherein the container body includes a neck that extends from the opening portion, the wireless IC tag includes an antenna for contactless communication, a wiring for wire break detection, and an IC chip connected to the antenna and the wiring, the cap seal includes a cylindrical member that surrounds the neck, the cylindrical member having a metal section disposed on a side face of the neck, and the wireless IC tag is disposed to extend between opposite lateral sides of the neck via the sealing member, and is partially sandwiched between the neck and the cylindrical member with the IC chip being exposed from the cap seal, the cap seal includes a top face that is connected to a first end, which is one of two axial ends of the cylindrical member, and closes the cylindrical member at the first end, and the cylindrical member includes at least one insulating section extending from the first end, and the metal section and the insulating section are joined to each other to form a closed annular shape in a circumferential direction of the cylindrical member, wherein the wireless IC tag includes a substrate having a first surface and a second surface, which is a surface facing away from the first surface, and the antenna and a portion in which wirings for the wire break detection are densely arranged are overlapped with each other with the substrate therebetween.

2. The container with a wireless IC tag of claim 1, wherein the wireless IC tag includes a substrate having a first surface and a second surface, which is a surface facing away from the first surface, the antenna includes a coil section located on the first surface, the coil section having discontinuous portions on the first surface, a jumper wire located on the second surface, the jumper wire overlapping the coil section with the substrate therebetween so as to connect the discontinuous portions of the coil section, and a connection conductor that penetrates the substrate and electrically connects an end of the jumper wire to the coil section, and the jumper wire is exposed from the cap seal.

3. The container with a wireless IC tag of claim 1, wherein the antenna is partially covered with the cap seal.

4. The container with a wireless IC tag of claim 1, wherein the cap seal includes a top face that is connected to a first end, which is one of two axial ends of the cylindrical member, and closes the cylindrical member at the first end, and the IC chip is exposed from a second end, which is the other of the two axial ends of the cylindrical member.

5. The container with a wireless IC tag of claim 1, wherein the cap seal includes a top face that is connected to a first end, which is one of two axial ends of the cylindrical member and closes the cylindrical member at the first end, and the wireless IC tag includes a dense wiring portion in which the wiring for wire break detection is densely arranged, the dense wiring portion being sandwiched between the top face and the sealing member.

6. The container with a wireless IC tag of claim 1, wherein the wireless IC tag includes a substrate having a first surface and a second surface, which is a surface facing away from the first surface, and the antenna and a portion in which wirings for the wire break detection are densely arranged are not overlapped with each other with the substrate therebetween.

* * * * *